May 1, 1962
C. R. WEISEND
3,031,887
DEVICE FOR MEASUREMENT OF LIQUID LEVEL
OR VOLUME OF LIQUEFIED GASES
Original Filed Aug. 10, 1959
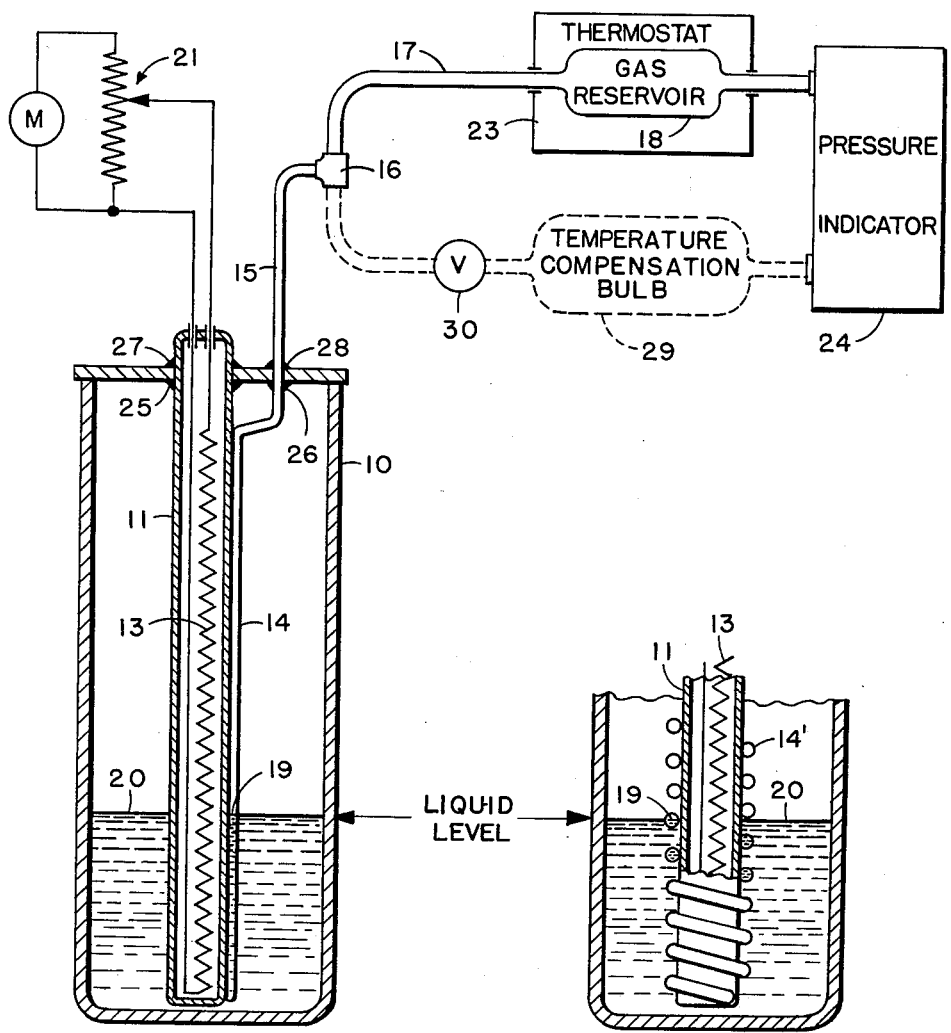
*Fig 1*    *Fig 2*
INVENTOR.
CHARLES R. WEISEND
BY Charles M. Hogan
ATTORNEY.

ial No. 832,619, filed August 10, 1959, and now
United States Patent Office 3,031,887
Patented May 1, 1962

3,031,887
DEVICE FOR MEASUREMENT OF LIQUID LEVEL
OR VOLUME OF LIQUEFIED GASES
Charles R. Weisend, Columbus, Ohio, assignor to Herrick
L. Johnston, Inc., Columbus, Ohio, a corporation of
Ohio
Continuation of application Ser. No. 832,619, Aug. 10,
1959. This application Dec. 1, 1960, Ser. No. 73,146
3 Claims. (Cl. 73—295)

This is a continuation of United States patent application Serial No. 832,619, filed August 10, 1959, and now abandoned.

The present invention relates to level or volume indicators for cryogenic applications. As stated in "Cryogenic Engineering," Scott (Van Nostrand, New York, 1959), at page 243, "Many types of level indicators have been used in Dewars and other cyrogenic equipment." These are summarized in Scott's work at pages 243–247 and illustrate the need for an economical and accurate indicator. The present invention is intended to serve that need and this is accordingly its principal object.

The present invention is based on the observation that when a capillary containing gas is partially immersed in a cryogenic liquid, the gas is liquefied until its level and the liquid level in the container are equalized.

Now if gas contained in the capillary is in communication with a gas reservoir, maintained under constant temperature conditions, then the pressure in this gas reservoir is a measure of the liquid level in the Dewar or cryogenic liquid storage vessel. For example, if the liquid level in the storage vessel is high, then more of the gas in the capillary is liquefied than would be the case if the liquid level is low. In the former case, the pressure drop in the gas reservoir due to the liquefication of gas in the capillary is considerable. In the latter case less gas in the capillary is liquefied and the pressure drop in the gas reservoir is less.

Stating this phenomenon in other words, the heat loss of the gas contained in the capillary to the surrounding cryogenic liquid in the storage vessel is sufficient to liquefy this gas in the capillary until the liquid levels in the storage vessel and the capillary are equalized. This liquefaction is accompanied by pressure changes in the capillary and in the accompanying gas reservoir. This pressure is measured by an appropriate conventional pressure-measuring device, correlated to the height of the liquid level in the capillary and calibrated in terms of liquid level in the storage vessel. The device is also suitable to measure liquid volume in any storage vessel or closed system.

For a better understanding of the invention, together with other objects, advantages and capabilities thereof, reference is made to the appended description of the accompanying drawings, in FIG. 1 of which there is illustrated a system containing a liquid level measuring device in accordance with the present invention, and in FIG. 2 of which there is illustrated, also in section, an alternative form of liquid level indicator having a helical type of capillary.

In the drawings:

Reference numeral 10 in FIG. 1 is indicative of a cryogenic liquid storage vessel or Dewar, for example. Immersed in vessel 10 is my novel indicating vehicle. It comprises a metallic sheath 11. Axially disposed within the sheath and suitably electrically insulated therefrom is heater 13, energized from an adjustable source of electric current 21. Mounted on and effectively in thermal contact with the sheath 11 is a gas capillary 14 which communicates, as by pipe 15, fitting 16, and pipe 17, with a gas reservoir 18.

In operation, the gas in capillary 14 liquefies up to the level indicated by the reference numeral 19, so that it is equated to the liquid level of the surrounding cryogenic liquid 20. The operation of heater 13 is such as to assure that gas in the capillary above the level 19 remains vaporized. The wall of the capillary could of course be used for that purpose. The heater prevents the rise of liquid level in the capillary above the level of the liquid in the storage vessel, which undesired rise could be caused by the capillary action or by loss of heat to the stored liquid in the storage vessel over and above the loss involved in equating level 19 to level 20.

The fact that the liquid in the capillary is equated to the liquid level of the surrounding liquid furnishes an excellent basis for the measurement of level indication. That is to say, the volume of gas in the system 14, 15, 16, 17 and 18 is predetermined. When cryogenic liquid is placed in the storage vessel 10 there is a great loss of gas volume and pressure in that system and accordingly the measurement of level indication is quite sensitive, a small change in liquid level producing a great change in the pressure measurement at the gas reservoir. The efficacy of these pressure changes as a measure of level of the liquid in the storage vessel depends of course on maintenance of consistancy of temperature at gas reservoir 18, and this can be accomplished by a thermostat 23 shown in block form.

The level measurement is made by pressure indicating device 24 suitably calibrated in terms of liquid level in the storage vessel 10.

It will be understood that suitable solder seals 25, 26, 27 and 28 are provided as required.

The capillary 14 is straight in the FIG. 1 embodiment which is well suited to liquid level measurement. The FIG. 2 embodiment is identical to that of FIG. 1 except that it uses a helically wound capillary 14'. The helically wound capillary is preferable for liquid volume measurements because greater sensitivity can be achieved by increasing the volume of the liquefied gas in the capillary. The storage vessel 10 being of upright cylindrical form, the volume of stored cryogenic liquid changes in the same ratio as the liquid level. Therefore, either a straight or helical capillary can be used as a volume indicator. This would be true in any case where the volume of the stored cryogenic liquid is directly proportional to its height. On the other hand, if the storage vessel is a cylinder in a horizontal position, then the volume of stored liquid is not proportional to the height and a capillary 14' would be wound in a non-linear fashion with the turns close together at the center and further apart at the top and bottom of the capillary. This for the reason that a small change in liquid level at a zone near the bottom of the storage vessel means a small change in volume while a corresponding change in level near the median line of the vessel means a large change in volume, for example. The helical capillary 14' can be wound in any manner suitable to indicate volume.

The pressure indicating device 24 may be either an absolute or differential pressure gauge. In the event that a differential pressure gauge is employed, the pressure indicator may be returned to fitting 16 and capillary 15 via a temperature compensation bulb 29 and a valve 30. When the temperature compensating bulb is used, a thermostat is not required.

The invention is believed to possess several advantages. First, it is extremely sensitive, a small change in the level of liquid in the storage vessel being accompanied by a very large pressure change at indicator 24. Second, the indicating device 24 can be conveniently located at a point remote from the storage vessel and because of this factor and the sensitivity factor just mentioned, this indicator is particularly suited to transducer systems.

Normally, the same gas is used in the capillary as in the storage vessel 10.

To compensate for the temperature changes in the stored liquid due to pressurization of the storage vessel 10, the minimum pressure in the gas reservoir 18 must be higher than the maximum pressure in the storage vessel.

While there have been shown and described what are at present considered to be the preferred embodiments of the invention, it will be understood by those skilled in the art that various changes and modifications may be made therein without departing from the true scope of the invention as defined in the appended claims.

I claim:

1. A level indicating device comprising a sheath to be inserted into a liquid to be measured, an electrical resistance heater mounted within said sheath, a gas-containing capillary mounted on said sheath, a gas reservoir in communication with said capillary, said heater means being utilized to equate the level of gas which liquefies in the capillary to the level to be measured, pressure indicating means coupled to said gas reservoir to determine liquid level or liquid volume as a function of the pressure effect in the gas reservoir and capillary, and means for maintaining constant the temperature of said gas reservoir.

2. A level indicating device in accordance with claim 1 in which the capillary is helically wound.

3. A level indicating device comprising a sheath to be inserted into a liquid to be measured, an electrical resistance heater mounted within said sheath, a gas-containing capillary mounted on said sheath, a gas reservoir in communication with said capillary, said heater means being utilized to equate the level of gas liquefied in the capillary to the level to be measured, and pressure measuring means coupled to said gas reservoir to determine liquid level or liquid volume as a function of the pressure effect in the gas reservoir and capillary, said pressure measuring means being a differential device associated in series with a temperature compensation bulb at the inlet and outlet ends of said gas reservoir.

References Cited in the file of this patent

UNITED STATES PATENTS

| | | |
|---|---|---|
| 2,525,807 | Lane et al. | Oct. 17, 1950 |

FOREIGN PATENTS

| | | |
|---|---|---|
| 1,933 | Great Britain | July 11, 1857 |
| 225,035 | Great Britain | Nov. 27, 1924 |
| 587,032 | Great Britain | Apr. 11, 1947 |
| 130,943 | Sweden | Feb. 27, 1951 |